(12) United States Patent
Chen et al.

(10) Patent No.: US 11,182,286 B2
(45) Date of Patent: Nov. 23, 2021

(54) DATA STORAGE DEVICE AND CONTROL METHOD FOR NON-VOLATILE MEMORY

(71) Applicant: Silicon Motion, Inc., Jhubei (TW)

(72) Inventors: Jian-Yu Chen, Taichung (TW); Bo-Yan Jhan, New Taipei (TW); Yuh-Jang Lo, Kaohsiung (TW); Shih-Chang Chang, Zhunan Township, Miaoli County (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/585,583

(22) Filed: Sep. 27, 2019

(65) Prior Publication Data
US 2020/0272561 A1    Aug. 27, 2020

Related U.S. Application Data

(60) Provisional application No. 62/810,422, filed on Feb. 26, 2019.

(30) Foreign Application Priority Data

Jul. 17, 2019   (TW) .................................. 108125218

(51) Int. Cl.
*G06F 12/02*    (2006.01)
(52) U.S. Cl.
CPC .. *G06F 12/0246* (2013.01); *G06F 2212/7201* (2013.01)
(58) Field of Classification Search
CPC ......... G06F 12/0246; G06F 2212/7201; G06F 12/122; G06F 2212/1044
See application file for complete search history.

(56) References Cited

U.S. PATENT DOCUMENTS 5,319,778 A * 6/1994 Catino ................ G06F 16/9024
7,587,427 B2   9/2009 Satou et al.
(Continued)

FOREIGN PATENT DOCUMENTS

TW      201413453 A    4/2014
TW      201439772 A   10/2014
(Continued)

OTHER PUBLICATIONS

"What is Bit Masking?;" Stack Overflow; http://web.archive.org/web/20161126111540/https://stackoverflow.com/questions/10493411/what-is-bit-masking Nov. 2016; pp. 1-4.
(Continued)

*Primary Examiner* — Masud K Khan
*Assistant Examiner* — Trung-Hao Joseph Nguyen
(74) *Attorney, Agent, or Firm* — McClure, Qualey & Rodack, LLP

(57) ABSTRACT

A high-performance data storage device is disclosed. A non-volatile memory stores a logical-to-physical address mapping table that maps logical addresses recognized by a host to a physical space in the non-volatile memory. The logical-to-physical address mapping table is divided into a plurality of sub mapping tables. A memory controller utilizes temporary storage when controlling the non-volatile memory. The memory controller plans a sub mapping table area in the temporary storage to store sub mapping tables corresponding to a plurality of nodes which are linked and managed by multiple linked lists.

18 Claims, 11 Drawing Sheets

(56) References Cited

U.S. PATENT DOCUMENTS

| | | | |
|---|---|---|---|
| 8,112,574 B2 | 2/2012 | Lee et al. | |
| 9,268,706 B2 | 2/2016 | Kunimatsu et al. | |
| 9,383,927 B2 | 7/2016 | Thomas | |
| 9,460,025 B1* | 10/2016 | Wallace | G06F 12/0871 |
| 9,529,731 B1* | 12/2016 | Wallace | G06F 12/122 |
| 10,635,358 B2 | 4/2020 | Hsiao et al. | |
| 10,810,123 B1* | 10/2020 | Xu | G06F 12/0246 |
| 2003/0204702 A1 | 10/2003 | Lomax, Jr. et al. | |
| 2010/0077136 A1 | 3/2010 | Ware et al. | |
| 2012/0166723 A1* | 6/2012 | Araki | G06F 12/0246 |
| | | | 711/113 |
| 2014/0032818 A1 | 1/2014 | Chang et al. | |
| 2014/0082265 A1 | 3/2014 | Cheng | |
| 2014/0181415 A1* | 6/2014 | Loh | G06F 12/0862 |
| | | | 711/137 |
| 2014/0223071 A1 | 8/2014 | Bert et al. | |
| 2014/0223079 A1 | 8/2014 | Zhang et al. | |
| 2015/0339058 A1* | 11/2015 | Yoshii | G06F 3/061 |
| | | | 711/103 |
| 2016/0004642 A1* | 1/2016 | Sugimoto | G06F 12/0871 |
| | | | 711/128 |
| 2016/0124649 A1 | 5/2016 | Liu et al. | |
| 2016/0291878 A1 | 10/2016 | Kang | |
| 2017/0083451 A1 | 3/2017 | Tan | |
| 2017/0308396 A1 | 10/2017 | Hsieh | |
| 2018/0196747 A1 | 7/2018 | Tang | |
| 2019/0057038 A1* | 2/2019 | Haswell | G06F 12/0875 |
| 2019/0227931 A1* | 7/2019 | Jung | G06F 12/0246 |
| 2019/0310944 A1 | 10/2019 | Rudoff et al. | |
| 2020/0264984 A1* | 8/2020 | Adams | G06F 12/0292 |

FOREIGN PATENT DOCUMENTS

| | | |
|---|---|---|
| TW | I521343 B | 2/2016 |
| TW | 201712549 A | 4/2017 |
| TW | 201810017 A | 3/2018 |
| TW | 201826126 A | 7/2018 |
| TW | I660346 B | 5/2019 |

OTHER PUBLICATIONS

Non-Final Office Action dated Mar. 26, 2021, issued in U.S. Appl. No. 16/728,294.

* cited by examiner

DATA STORAGE DEVICE AND CONTROL METHOD FOR NON-VOLATILE MEMORY

CROSS REFERENCE TO RELATED APPLICATIONS

This Application claims the benefit of U.S. Provisional Application No. 62/810,422, filed on Feb. 26, 2019, the entirety of which is incorporated by reference herein.

This Application also claims priority of Taiwan Patent Application No. 108125218, filed on Jul. 17, 2019, the entirety of which is incorporated by reference herein.

BACKGROUND OF THE INVENTION

Field of the Invention

The present invention is related to data storage devices, and in particular it is related to the management of a logical-to-physical address mapping table (L2P table).

Description of the Related Art

There are various forms of non-volatile memory (NVM) for long-term data storage, such as flash memory, magnetoresistive RAM, ferroelectric RAM, resistive RAM, spin transfer torque-RAM (STT-RAM), and so on. These non-volatile memories may be used as the storage medium in a data storage device.

Non-volatile memory typically has particular storage characteristics. The technical field needs to develop the corresponding control technology.

BRIEF SUMMARY OF THE INVENTION

A data storage device in accordance with an exemplary embodiment of the present invention includes a non-volatile memory, a memory controller, and temporary storage. The memory controller stores a logical-to-physical address mapping table that maps logical addresses recognized by a host to a physical space in the non-volatile memory. The logical-to-physical address mapping table is divided into a plurality of sub mapping tables. The memory controller utilizes the temporary storage when controlling the non-volatile memory. The memory controller plans a sub mapping table area in the temporary storage to store sub mapping tables corresponding to a plurality of nodes which are linked and managed by multiple linked lists. A flexible use of limited sub mapping table area is introduced.

In an exemplary embodiment, the memory controller uses an unsaved linked list to manage sub mapping tables which have changes but have not been sealed (updated) to the non-volatile memory.

In an exemplary embodiment, the memory controller initially uses a free linked list to link all nodes. In response to an update on a first sub mapping table that has no node corresponding thereto, the memory controller changes a tail node of the free linked list to a head node of the unsaved linked list and downloads the first sub mapping table from the non-volatile memory to the sub mapping table area to be indicated by information within the head node of the unsaved linked list.

In an exemplary embodiment, the memory controller further manages an unchanged linked list. In response to a read command from the host to call a second sub mapping table that has no node corresponding thereto, the memory controller changes a tail node of the free linked list to a head node of the unchanged linked list and downloads the second sub mapping table from the non-volatile memory to the sub mapping table area to be indicated by information within the head node of the unchanged linked list.

In response to an internal request to refer to a third sub mapping table that has no node corresponding thereto, the memory controller may change a tail node of the free linked list to a head node of the free linked list and download the third sub mapping table from the non-volatile memory to the sub mapping table area. The head node of the free linked list corresponds to the downloaded third sub mapping table.

In response to an update on a fourth sub mapping table managed by the unchanged linked list, the memory controller may change a node corresponding to the fourth sub mapping table to a head node of the unsaved linked list.

In response to an update on a fifth sub mapping table managed by the free linked list, the memory controller may change a node corresponding to the fifth sub mapping table to a head node of the unsaved linked list.

In response to an internal request to refer to a sixth sub mapping table managed by the free linked list, the memory controller may change a node corresponding to the sixth sub mapping table to be a head node of the free linked list.

When a total number of nodes managed by the free linked list is lower than a first threshold but a total number of nodes managed by the unchanged linked list is not lower than a second threshold, the memory controller may change a tail node of the unchanged linked list to a head node of the free linked list.

When the total number of nodes managed by the free linked list is lower than the first threshold and the total number of nodes managed by the unchanged linked list is lower than the second threshold, the memory controller may seal a sub mapping table indicated by information within a tail node of the unsaved linked list to the non-volatile memory and change the tail node of the unsaved linked list to a head node of the free linked list.

The aforementioned memory controller for non-volatile memory may be implemented in other architectures. In an exemplary embodiment, a non-volatile memory control method based on the foregoing concept, including the following steps: storing a logical-to-physical address mapping table in the non-volatile memory, wherein the logical-to-physical address mapping table maps logical addresses recognized by a host to a physical space in the non-volatile memory, and the logical-to-physical address mapping table is divided into a plurality of sub mapping tables; utilizing temporary storage when controlling the non-volatile memory; and planning a sub mapping table area in the temporary storage to store sub mapping tables corresponding to a plurality of nodes which are linked and managed by multiple linked lists.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, USB flash devices, SSDs, and so on. In another exemplary embodiment, a flash memory may be packaged with a controller to form a multiple-chip package called eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
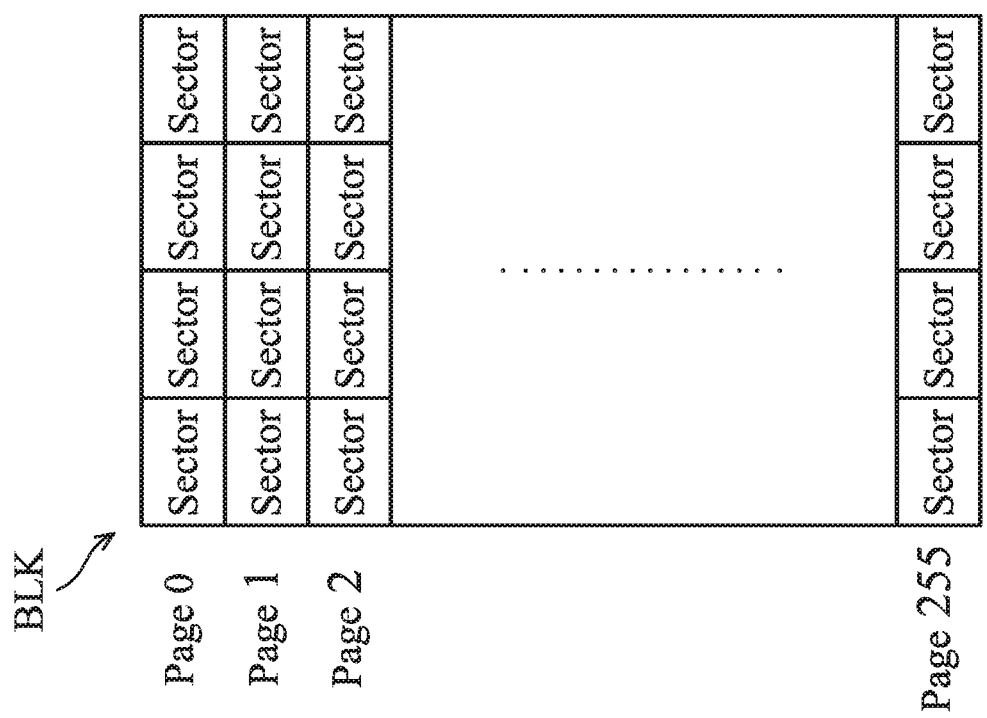
FIG. 1 illustrates a physical architecture of a flash memory and one block BLK is shown.
Figure 2:
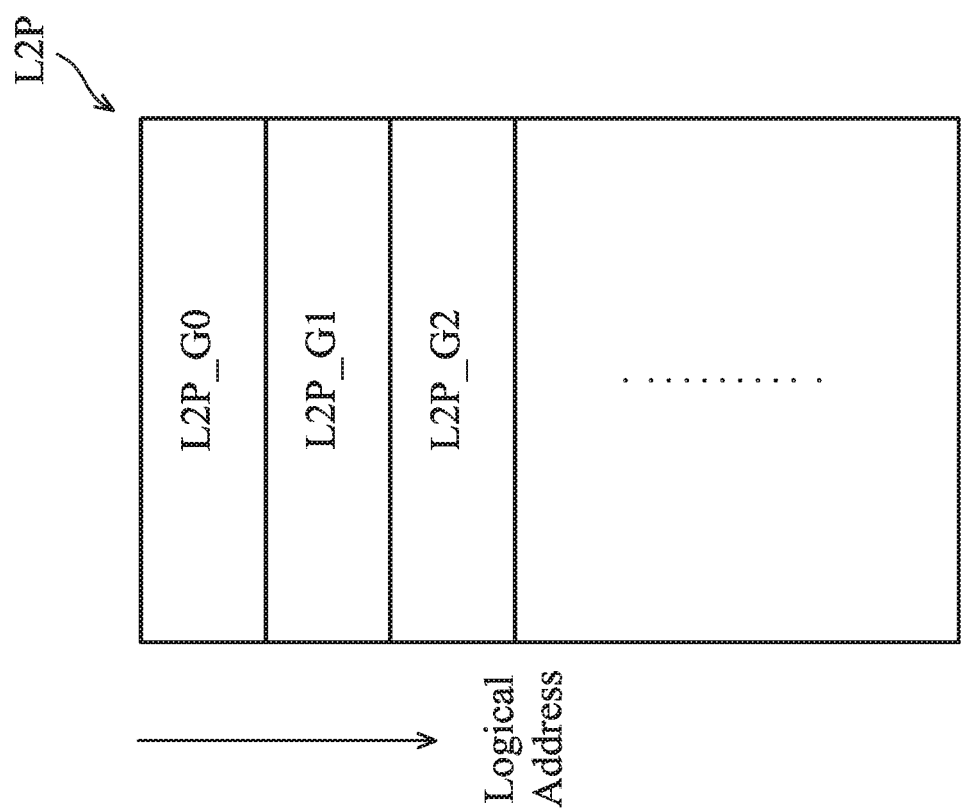
FIG. 2 illustrates how to divide mapping information of a flash memory into sub mapping tables L2P_G#.
Figure 3:
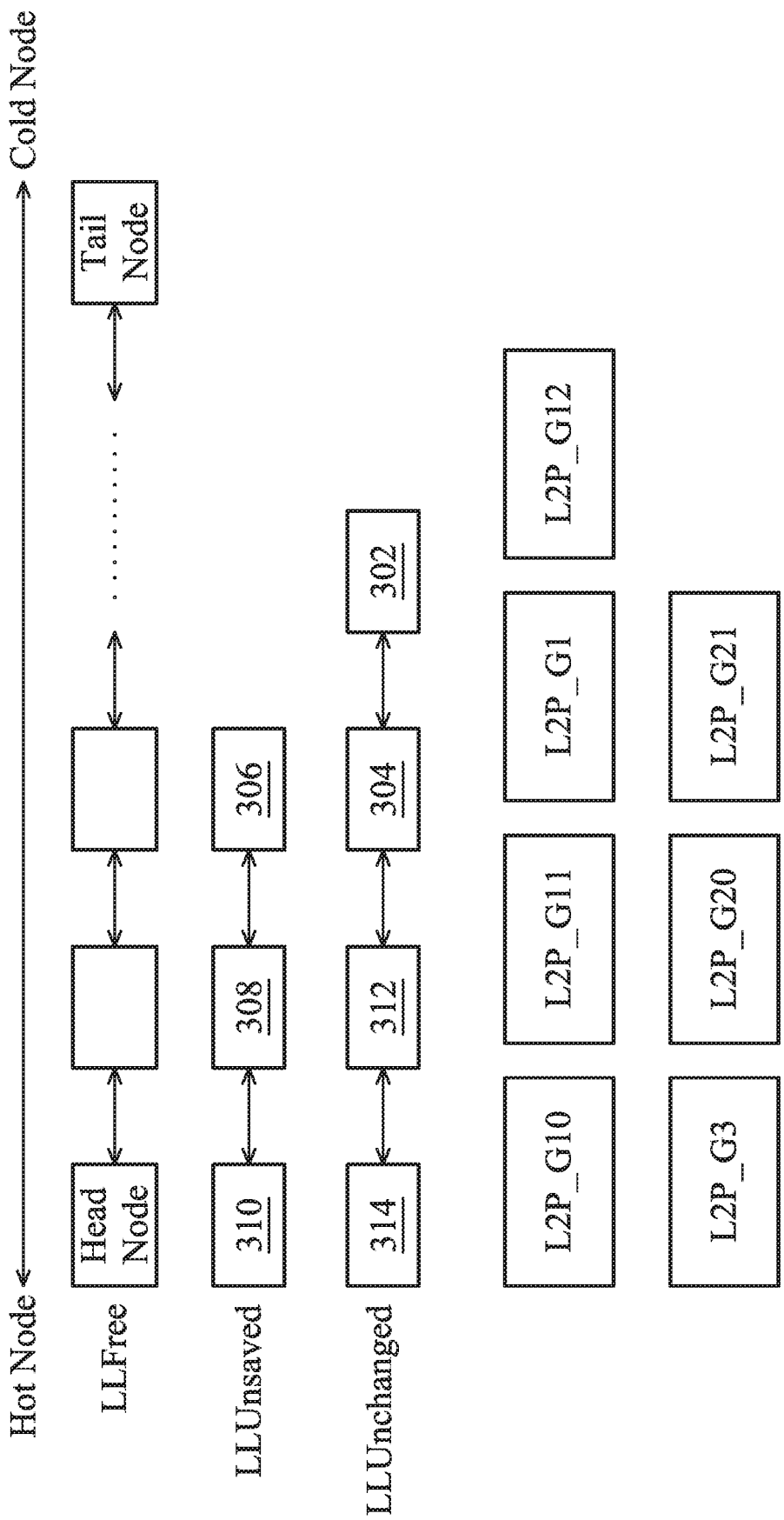
FIG. 3 illustrates a technology of linked list, for managing the temporary storage of mapping information of the flash memory.
Figure 4:
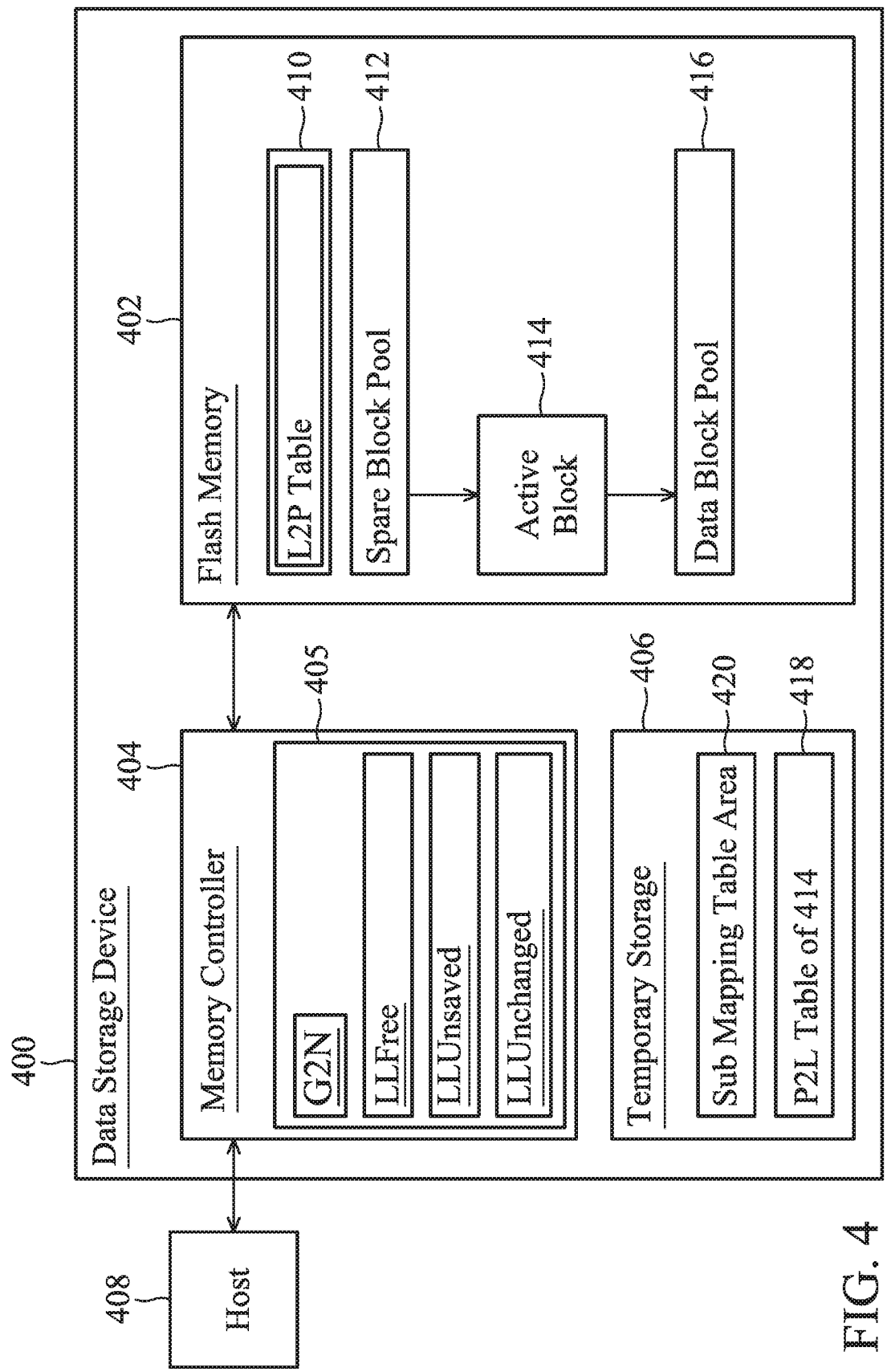
FIG. 4 is a block diagram depicting a data storage device 400 in accordance with an exemplary embodiment of the disclosure.

FIG. 1 illustrates a physical architecture of a flash memory and one block BLK is shown. FIG. 2 illustrates how to divide mapping information of a flash memory into sub mapping tables L2P_G#. FIG. 3 illustrates a technology of linked list, for managing the temporary storage of mapping information of the flash memory. FIG. 4 is a block diagram depicting a data storage device 400 in accordance with an exemplary embodiment of the disclosure.

Referring to FIG. 4, a flash memory 402, a memory controller 404, and a temporary storage 406 are shown. The host 408 may access the flash memory 402 through the memory controller 404. In addition, the memory controller 404 may optimize the flash memory 402 by garbage collection, wear leveling, block data transfer, and the like. The memory controller 404 may use the temporary storage 406 to cache data to speed up data access of the flash memory 402. The temporary storage 406 may be a DRAM.

The physical space of the flash memory 402 may be divided into blocks to be allocated for data storage. FIG. 1 illustrates one block BLK, which includes a plurality of pages (e.g., Page0 . . . Page255). Each page includes a plurality of sectors (e.g. 4 sectors within one page as shown in FIG. 1). Each 16 KB page may include four sectors of 4 KB of data. In an exemplary embodiment, user data is programmed to a block according to the page number (from a low to a high number, e.g., from Page0 to Page255). In an exemplary embodiment, the data storage device adopts multi-channel technology, which regards several blocks accessed through the different channels as one super block, and treats pages among the different blocks as a super page. Storage space management is based on the super block/page concept to raise the data throughput of the data storage device. In addition, a manner of data access called interleaving may further improve the data throughput of the data storage device.

Flash memory 402 has its own particular storage characteristics. Instead of overwriting a space storing old data, a new version of data is saved in the spare space. The old data is marked as invalid. The sporadic valid data left in a block may be moved to a spare block by garbage collection. When only invalid data is contained in a block, an erase procedure can be performed to release and reuse the block. The physical space of the flash memory 402 is dynamically planned for use. At the host end, a logical address is used to recognize the data. A logical-to-physical address mapping table L2P is required to map logical addresses to the physical space of the flash memory, to show which physical block, page and sector each logical address (e.g., represented by a logical block address LBA or a global page number GHP) corresponds to.

To operate the flash memory 402, it may be necessary to refer to or change mapping information of the flash memory 402. To read the flash memory 402, the L2P mapping table (e.g., mapping information recorded in 410) needs to be referred to. After programming data to the flash memory 402, the L2P mapping table (410) should be updated. In addition to the read and write commands from the host 408, the data storage device 400 may also launch other programs, such as garbage collection, wear leveling, and the like. The internal operations all involve referring to or updating the L2P mapping table (410). Correspondingly, the data storage device 400 has temporary storage 406 (such as a DRAM). The L2P mapping table (410) may be partially or fully downloaded to the temporary storage 406 to speed up referring to or updating the mapping information.

However, as the storage capacity of the flash memory 402 increases, the size of the L2P mapping table (410) also increases, and therefore, the management of the L2P mapping table (410) becomes an important technical issue. In an exemplary embodiment, the physical address of a section of 4 KB of data is 4B in size. If the data storage device 400 has a storage capacity of 1 TB, the L2P mapping table (410) is in a size of 1 GB. The data storage device 400 needs the temporary storage 406 to provide at least a 1 GB space.

Because of the capacity limitation of DRAM (reducing the DRAM cost), a sequence of logical addresses is divided into sections, e.g., being divided into 1024 sections. The whole logical-to-physical address mapping table L2P is divided into 1024 sub mapping tables L2P_G. Only those being called as a reference or for updating are downloaded to the DRAM. FIG. 2 illustrates the concept of sub mapping tables L2P_G. In an exemplary embodiment, the entire logical-to-physical address mapping table L2P (410) is divided according to a fixed length of logical address. The sub mapping tables L2P_G correspond to the different logical address groups. For example, a sub mapping table L2P_G0 includes mapping information of logical addresses LBA0 to LBA1023, a sub mapping table L2P_G1 includes mapping information of logical addresses LBA1024 to LBA2047, and so on. Instead of being fully downloaded to the DRAM, the L2P mapping table (410) is just partially downloaded to the DRAM. For example, only 16 sub mapping table L2P_G are downloaded to the DRAM. Because each sub mapping table L2P_G requires only a small amount of storage space, a low-cost and small-capacity DRAM is enough. This hardware feature is also known as partial DRAM.

The blocks of the flash memory 402 may be classified according to purpose of use. For example, a block storing sub mapping tables L2P_G to form an L2P mapping table is called a system block, and belongs to a pool (410) of system information blocks. An active block 414 for the programming of user data issued by the host 408 is selected from a pool 412 of spare blocks. After closing the active block 414 (e.g., after writing end of block information, EOB, into the active block 414), the active block 414 is regarded as a data block and is pushed into a pool 416 of data blocks. When a data block no longer contains valid data, the data block is released to the pool 412 of spare blocks. In some exemplary embodiments, the active block 414 may be used as a destination block for data movement due to storage optimization.

How to efficiently manage the sub mapping tables L2P_G temporarily stored in the DRAM (406) becomes an important technical issue. In the present invention, sub mapping tables L2P_G are managed in the DRAM (406) by a linked list technology. The storage space of the DRAM (406) is divided into N areas for temporary storage of N sub mapping tables. For example, N is 16. Each area is in the size of one sub mapping table L2P_G. N nodes are managed by a linked list technology. Each node corresponds to one area of the DRAM (406), and records a starting address of the corresponding area. The sub mapping tables L2P_G downloaded to the DRAM (406) are managed by the nodes.

Referring to FIG. 3, there are three linked lists. The three linked lists have different identification codes and perform different functions. The first linked list links free nodes. For example, 16 free nodes may be linked by a free linked list LLFree and are allowed to be assigned to manage a newly-downloaded sub mapping table L2P_G. An unsaved linked list LLUnsaved is introduced to link the nodes corresponding to sub mapping tables L2P_G which have been changed but have not been saved back (sealed) to the flash memory. An unchanged linked list LLUnchanged is introduced to link the nodes corresponding to sub mapping tables L2P_G which are not changed on the DRAM. The number of nodes of the unsaved linked list LLUnsaved and the unchanged linked list LLUnchanged is initially zero. The nodes linked by the free linked list LLFree may be changed to be linked by the unsaved linked list LLUnsaved or the unchanged linked list LLUnchanged. Each linked list links nodes from a head node to a tail node. The linked order of the nodes may relate to the frequency of use of the corresponding sub mapping tables L2P_G. For example, the head node is also called a hot node, which means that its corresponding sub mapping table L2P_G is used recently; in contrast, the tail node is called a cold node, which means its corresponding sub mapping table L2P_G is not used recently.

Figure 5:
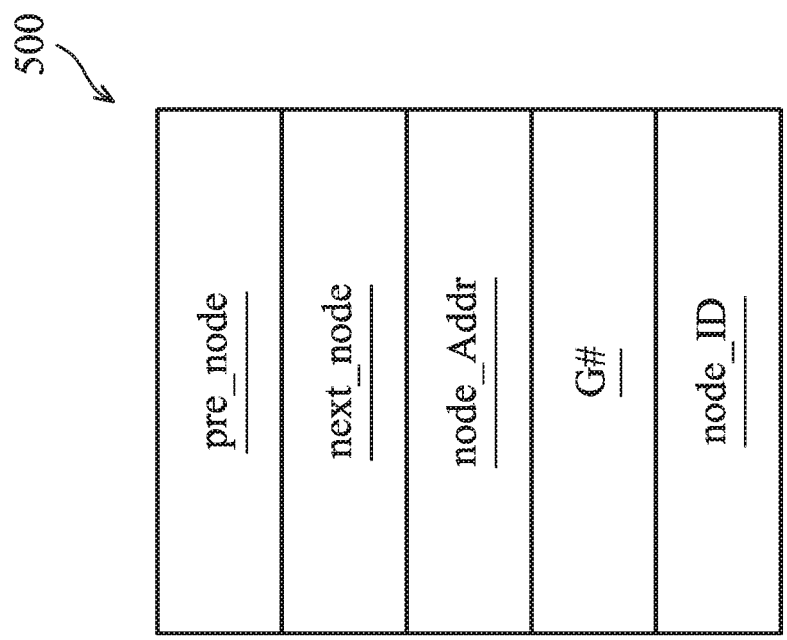
FIG. 5 illustrates the data structure of a node 500 used in the linked list technology in accordance with an exemplary embodiment of the present invention.

FIG. 5 illustrates the data structure of a node 500 used in the linked list technology in accordance with an exemplary embodiment of the present invention, which includes the following information:
  pre_node: a pointer points to the address of the previous node;
  next_node: a pointer points to the address of the next node;
  node_Addr: the address of the sub mapping table L2P_G stored in the temporary storage 406;
  G#: a group number of corresponding sub mapping table L2P_G;
  node_ID: identification code of linked list, for example, to identify the free linked list LLFree, the unsaved linked list LLUnsaved and the unchanged linked list LLUnchanged.

The memory controller 404 may manage the aforementioned free linked list LLFree, the unsaved linked list LLUnsaved and the unchanged linked list LLUnchanged on the DRAM 406 or an internal memory 405 (e.g., an SRAM), which speeds up the management of sub mapping tables L2P_G on a sub mapping table area 420. The DRAM 406 or the internal memory 405 may temporarily store a group-to-node mapping table G2N, which maps logical groups to the nodes. The group-to-node mapping table G2N may be optional. In another exemplary embodiment, the memory controller 404 reads the nodes of the free linked list LLFree, the unsaved linked list LLUnsaved and the unchanged linked list LLUnchanged to know whether a sub mapping table L2P_G is managed by the free linked list LLFree, the unsaved linked list LLUnsaved or the unchanged linked list LLUnchanged and where the sub mapping table L2P_G is stored in the sub mapping table area 420.

Figure 6:
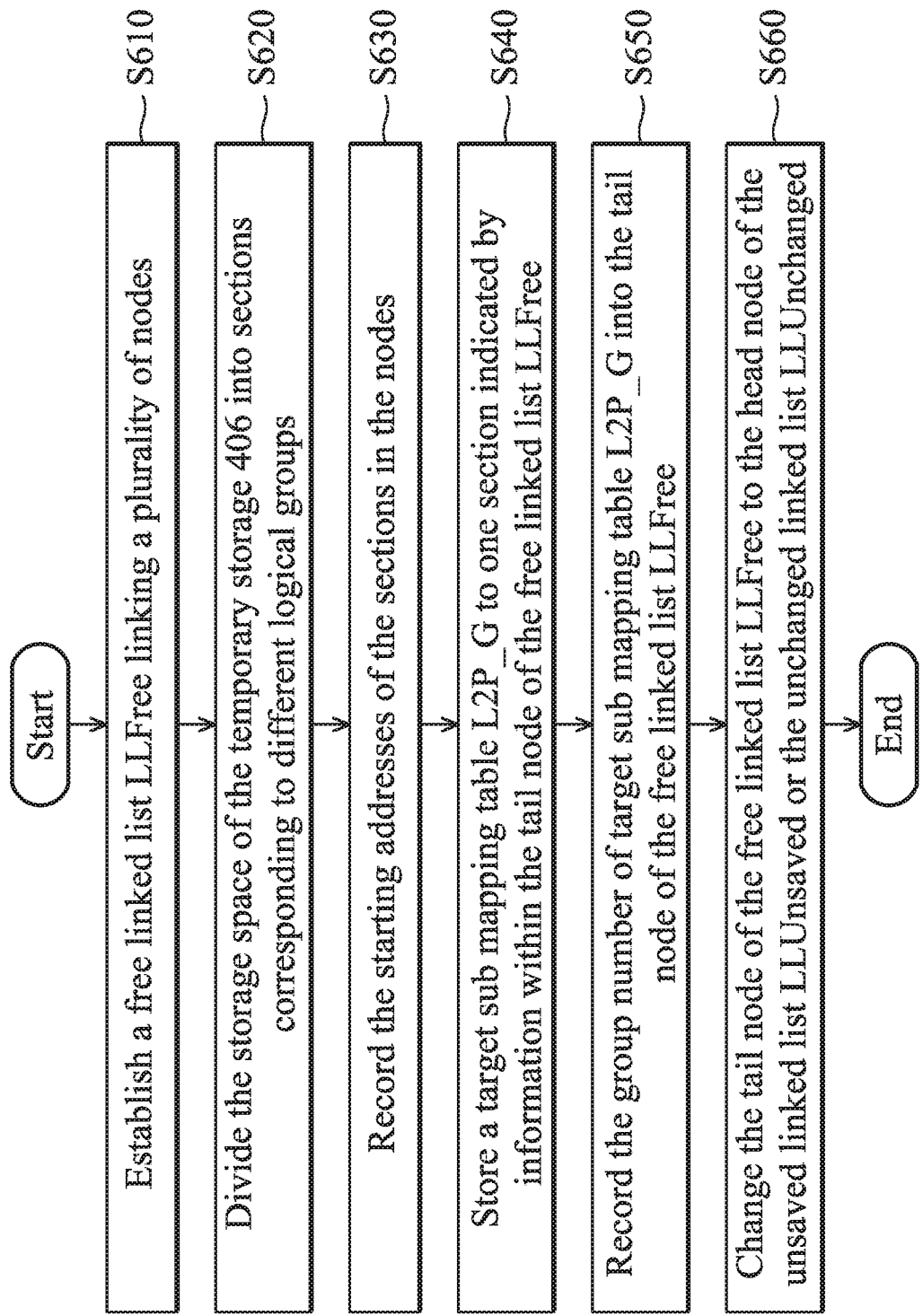
FIG. 6 is a flowchart of a method for managing sub mapping tables L2P_G by linked lists in accordance with exemplary embodiments of the present invention.

FIG. 6 is a flowchart of a method for managing sub mapping tables L2P_G by linked lists in accordance with exemplary embodiments of the present invention. In step S610, the memory controller 404 establishes a free linked list LLFree linking a plurality of nodes. For example, the memory controller 404 establishes a 16-node free linked list LLFree on the DRAM 406.

In step S620, the memory controller 404 divides the storage space of the temporary storage 406 into sections corresponding to different logical groups. For example, the memory controller 404 may divide the storage space of the DRAM 406 to provide 16 sections corresponding to 16 logical groups. Each section is planned for storage of one sub mapping table L2P_G corresponding to one logical group.

In step S630, the memory controller 404 records the starting addresses of the sections in the nodes. The memory controller 404 writes the addresses (starting addresses) of the 16 sections (planned to correspond to 16 logical groups) of the DRAM (406) to the 16 nodes as node_Addr.

In step S640, the memory controller 404 stores a target sub mapping table L2P_G to one section indicated by information within the tail node of the free linked list LLFree. The memory controller 404 may access the target sub mapping table L2P_G according to a host command (a read or write command) or an internal optimization procedure. For example, the target sub mapping table L2P_G is L2P_G13. The memory controller 404 reads the sub mapping table L2P_G13 from the flash memory 402 and temporarily stores the sub mapping table L2P_G13 in a section of the DRAM 406 that is indicated by information within the tail node of the free linked list LLFree.

In step S650, the memory controller 404 records the group number of target sub mapping table L2P_G into the tail node of the free linked list LLFree. Using the sub mapping table L2P_G13 as an example, the memory controller 404 records the group number 13 in the tail node of the free linked list LLFree as G#.

In step S660, the memory controller 404 changes the tail node of the free linked list LLFree to the head node of the unsaved linked list LLUnsaved or the unchanged linked list LLUnchanged. According to read and write commands from the host 408, the memory controller 404 changes the linking of the target sub mapping table L2P_G. Referring to FIG. 3, in response to read and write commands from the host 408, the memory controller 404 needs to access seven sub mapping tables L2P_G, including L2P_G10, L2P_G11, L2P_G1, L2P_G12, L2P_G3, L2P_G20, and L2P_G21. The sub mapping tables L2P_G10 and L2P_G11 are used to respond to read commands from the host 408, and are referred to for reference, without any modification. According to the linked list management of the present invention, the sub mapping tables L2P_G10 and L2P_G11 originally linked by tail nodes of the free linked list LLFree are changed to be managed by the unchanged linked list LLUnchanged (nodes 302 and 304). The sub mapping tables L2P_G1, L2P_G12, and L2P_G3 are used to respond to write commands from the host 408, and involve mapping information update. According to the linked list management of the present invention, the sub mapping tables L2P_G1, L2P_G12, and L2P_G3 originally linked by tail modes of the free link series LLFree are changed to be managed by the unsaved linked list LLUnsaved (nodes 306, 308 and 310). The sub mapping tables L2P_G20 and L2P_G21 are used to respond to read commands from the host 408. According to the linked list management of the present invention, the sub mapping tables L2P_G20 and L2P_G21 originally linked by tail nodes of the free linked list LLFree are changed to be managed by the unchanged linked list LLUnchanged (head nodes 312 and 314).

Since seven free nodes have been used (three moved to the unsaved linked list LLUnsaved and four moved to the unchanged linked list LLUnchanged), only nine nodes remain in the free linked list LLFree.

The accessing of the target sub mapping table L2P_G is discussed in this paragraph. As shown, the sub mapping table L2P_G10 corresponds to node 302, linked by the unchanged limited list LLUnchanged. To access the sub mapping table L2P_G10, the memory controller 404 checks the group-to-node mapping table G2N based on the group number, 10, of the sub mapping table L2P_G10. As recorded in the group-to-node mapping table G2N, node 302 corresponding to the group number 10 is obtained. According to the address node_Addr recorded in node 302, the sub mapping table L2P_G10 on the DRAM 406 is read. The memory controller 404 may refer to or update the mapping information recorded in the target sub mapping table L2P_G in response to the read or write command from the host 408. When the target sub mapping table L2P_G is the sub mapping table L2P_G9 and information regarding the group number 9 is not recorded in the group-to-node mapping table G2N, it means that the sub mapping table L2P_G9 is not linked by any linked list. The memory controller 404 may execute the linked list technology of the present invention to download the sub mapping table L2P_G9 for temporary storage.

When programming data to the active block 414, the memory controller 404 may dynamically update a physical-to-logical addresses (P2L) mapping table 418 on the temporary storage 406 to show the logical address of data stored in the active block 414. Mapping information that maps physical areas to logical addresses is recorded in the P2L mapping table 418. The memory controller 404 may update the sub mapping tables L2P_G based on the P2L mapping table 418.

Figure 7:
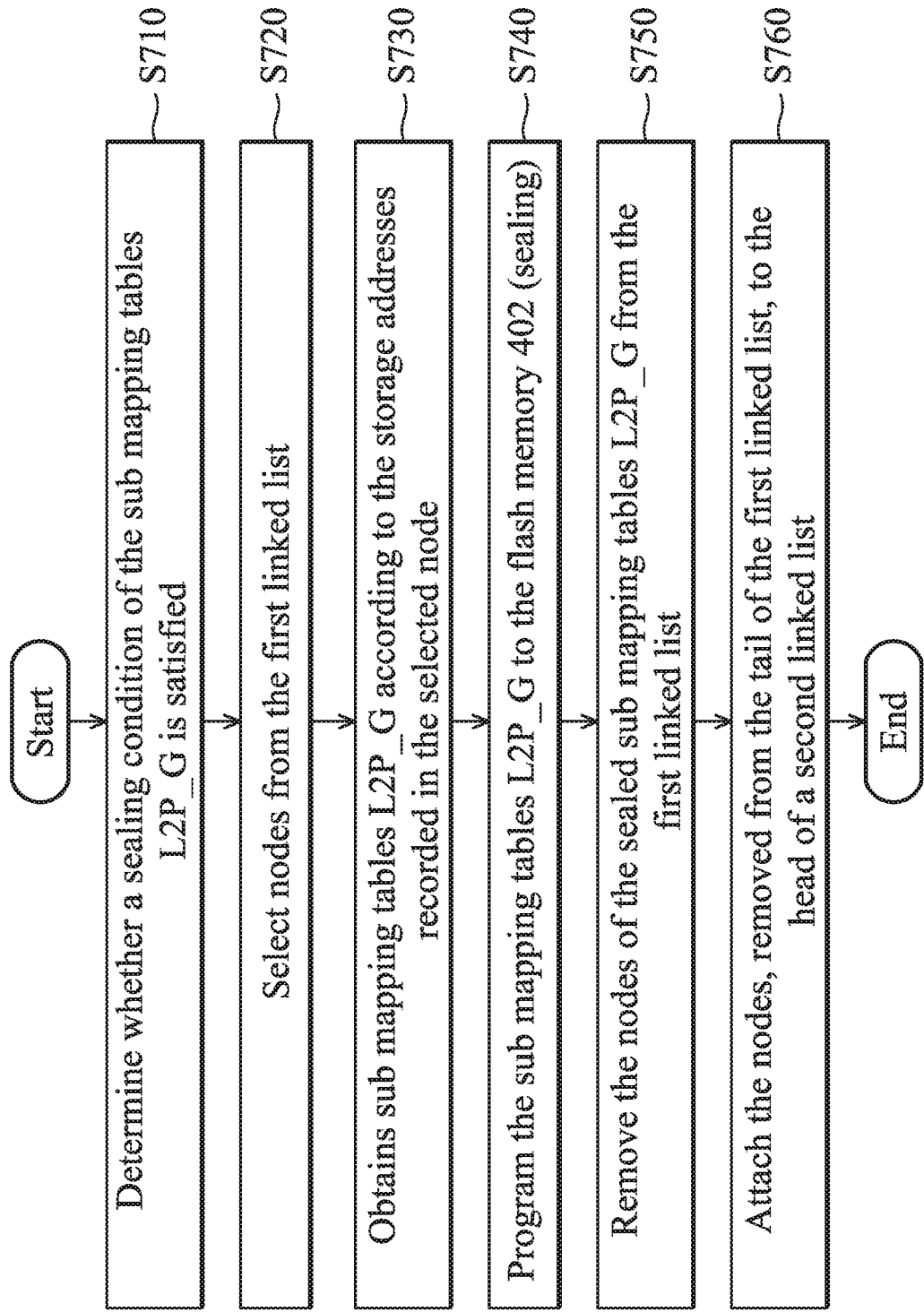
FIG. 7 is a flowchart illustrating the sealing of sub mapping tables L2P_G which may be triggered by a time limit (for example: 100 ms), a node number for unified sealing (for example: 4), a number of free nodes linked by the free linked list LLFree (e.g. 2), or a power failure event.

After sealing the sub mapping table L2P_G linked in the unsaved linked list LLUnsaved to the flash memory 402, the memory controller 404 should remove the corresponding node from the unsaved linked list LLUnsaved to avoid repeating the sealing of sub mapping table L2P_G. The present invention discloses a sealing method for sub mapping tables L2P_G that is proposed for the linked list technology. FIG. 7 is a flowchart illustrating the sealing of sub mapping tables L2P_G which may be triggered by a time limit (for example: 100 ms), a node number for unified sealing (for example: 4), a number of free nodes linked by the free linked list LLFree (e.g. 2), or a power failure event.

In step S710, the memory controller 404 determines whether a sealing condition of the sub mapping tables L2P_G is satisfied. If yes, step S720 is performed. Otherwise, the memory controller 404 keeps monitoring whether the sealing condition is satisfied.

In step S720, the memory controller 404 selects nodes from the first linked list. In an exemplary embodiment, the memory controller 404 selects nodes from the unsaved linked list LLUnsaved. For example, the four tail nodes corresponding to the sub mapping tables L2P_G1, L2P_G12, L2P_G3, and L2P_G30, are selected.

In step S730, the memory controller 404 obtains sub mapping tables L2P_G according to the storage addresses recorded in the selected node. For example, the memory controller 404 gets the sub mapping tables L2P_G1, L2P_G12, L2P_G3, and L2P_G30 from the sub mapping table area 420 according to the four storage addresses recorded in the selected four nodes.

In step S740, the memory controller 404 programs the sub mapping tables L2P_G to the flash memory 402 (sealing). The memory controller 404 may use a preset programming mode (like a TLC (triple-level cell) or QLC (quad-level cell) programming mode) or a default programming mode (like an SLC (single level cell) programming mode) to seal the sub mapping tables L2P_G1, L2P_G12, L2P_G3, and L2P_G30 to the flash memory 402. In an exemplary embodiment, four sub mapping tables L2P_G are preferably written to the same page of one system block.

In step S750, the memory controller 404 removes the nodes of the sealed sub mapping tables L2P_G from the first linked list. In an exemplary embodiment, the memory controller 404 removes the final four nodes from the unsaved linked list LLUnsaved. The fifth node counted from the end of the original linked list LLUnsaved becomes the tail node of the unsaved linked list LLUnsaved.

In step S760, the memory controller 404 attaches the nodes, removed from the tail of the first linked list, to the head of a second linked list. For example, the memory controller 404 attaches the four nodes, removed from the tail of the unsaved linked list LLUnsaved, to the head of the unchanged linked list LLUnchanged (or the free linked list LLFree). The fourth node counted from the end of the original unsaved linked list LLUnsaved is regarded as the head node of the unchanged linked list LLUnchanged (or the free linked list LLFree), now.

The memory controller 404 may change the node position by changing the information pre_node, next_node, and node_ID contained in the node. When attaching or removing a node to or from a linked list, the memory controller 404 needs to change the contents of other nodes. For example, the contents of the previous and next nodes of the removed and attached node have to be modified for the integrity of the linked list.

Figure 8:
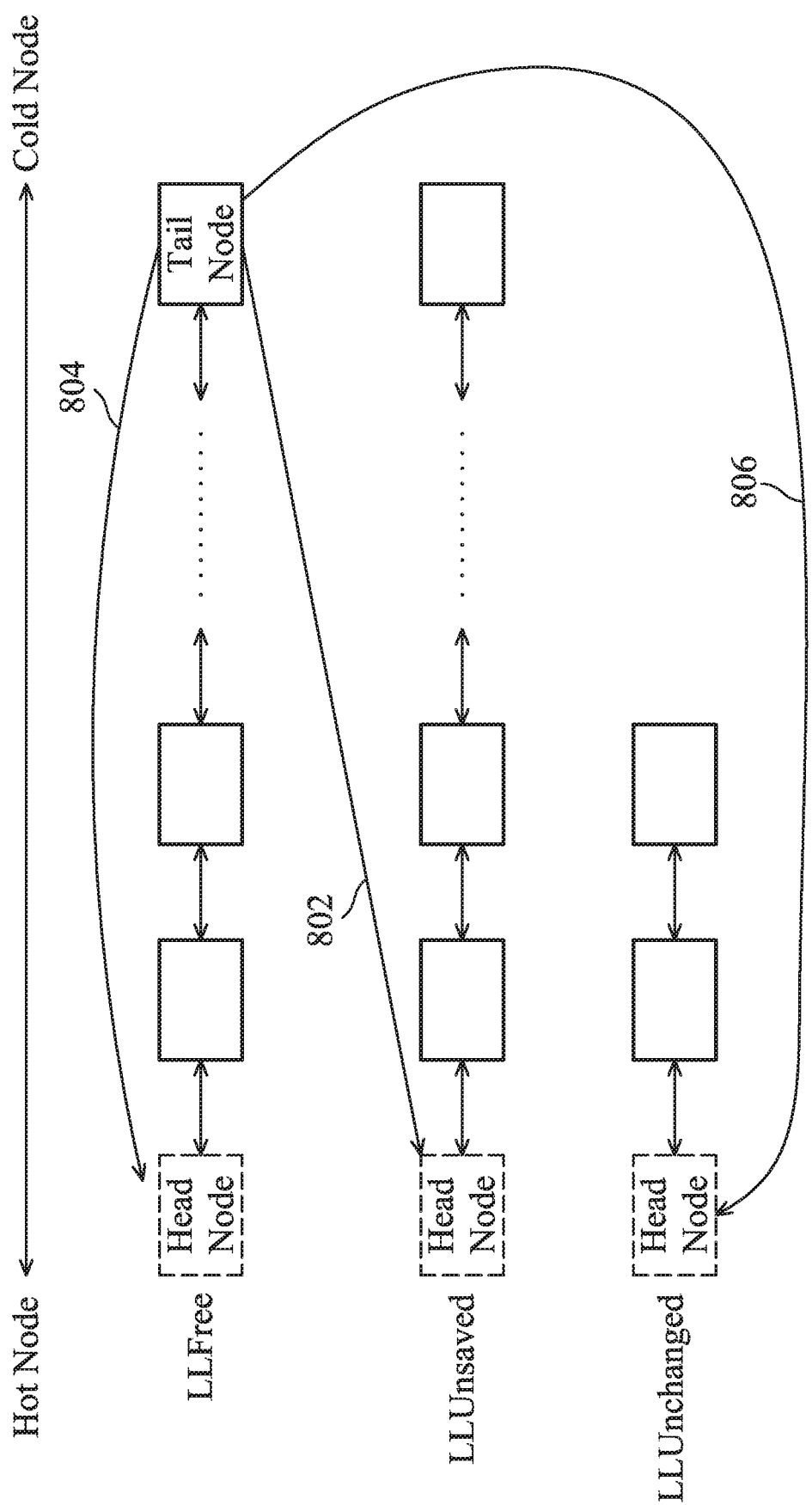
FIG. 8 illustrates how a node is attached to or removed from a linked list.

FIG. 8 illustrates how a node is attached to or removed from a linked list. In an exemplary embodiment, the tail node of the free linked list LLFree corresponds to a sub mapping table L2P_G13. To update the sub mapping table L2P_G13, the memory controller 404 moves the node of the sub mapping table L2P_G13 from the tail of the free linked list LLFree to the head of the unsaved linked list LLUnsaved as indicated by the arrow 802. The memory controller 404 is allowed to modify the sub mapping table L2P_G13 that has been changed to being linked by the unsaved linked list LLUnsaved. In another exemplary embodiment, the memory controller 404 only refers to the sub mapping table L2P_G13 as a reference and no modification is required. The memory controller 404 moves the node of the sub mapping table L2P_G13 from the tail of the free linked list LLFree to the head of the unchanged linked list LLUnchanged as indicated by the arrow 806. The memory controller 404 may refer to the sub mapping table L2P_G13 that has been linked in the unchanged linked list LLUnchanged. In another exemplary embodiment, the memory controller 404 refers to the sub mapping table L2P_G13 for optimization of the flash memory 402. The memory controller 404 moves the node of the sub mapping table L2P_G13 from the tail to the head of the free linked list LLFree as indicated by the arrow 804. The memory controller 404 may refer to the sub mapping table L2P_G13 whose node has been moved to the head of the free linked list LLFree.

Figure 9:
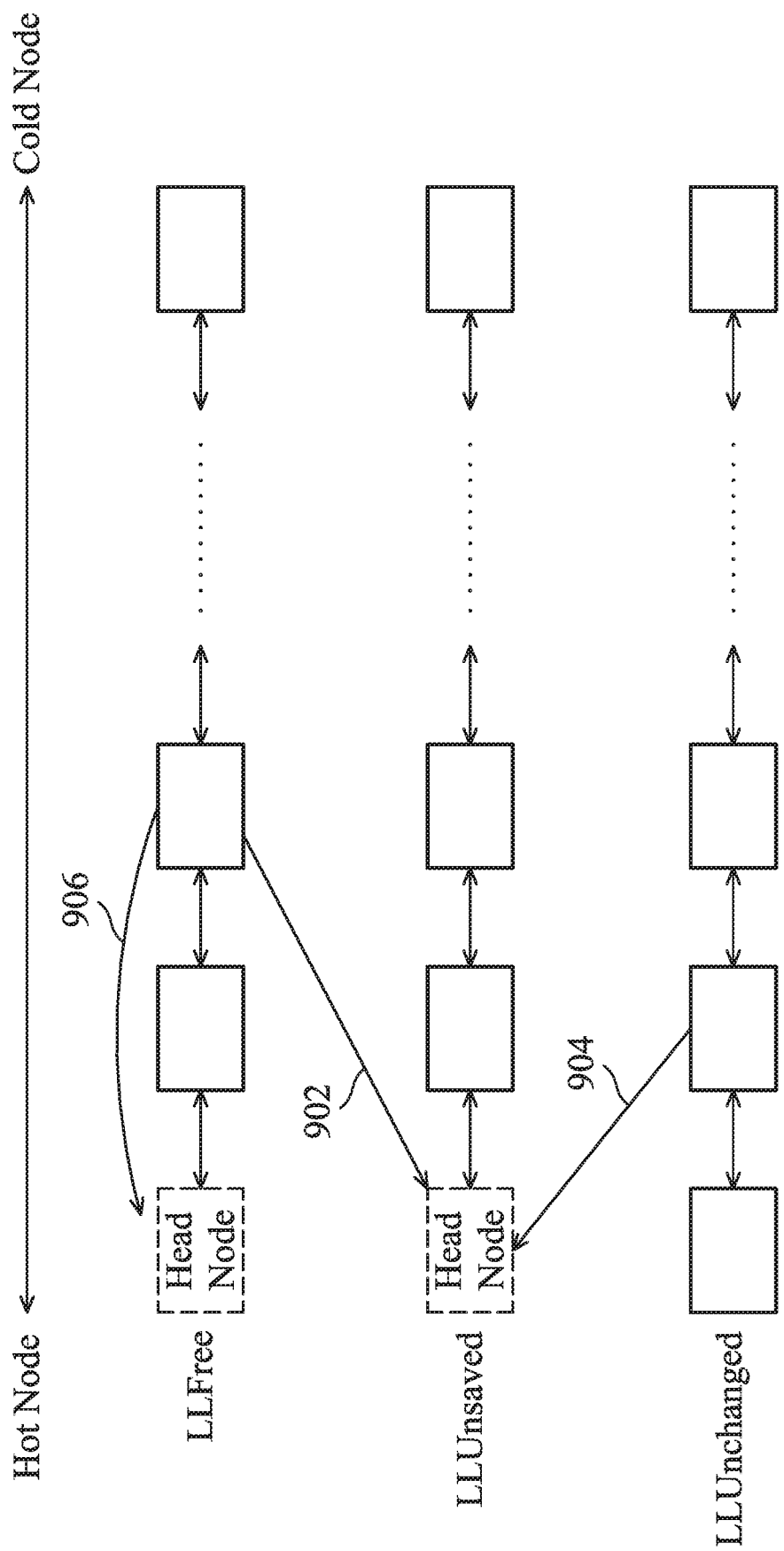
FIG. 9 illustrates other examples that the memory controller 404 changes the position of a node.

FIG. 9 illustrates other examples that the memory controller 404 changes the position of a node. As shown, one of the nodes of the free linked list LLFree corresponds to the sub mapping table L2P_G13. To update the sub mapping table L2P_G13, the memory controller 404 moves the corresponding node from the free linked list LLFree to the head of the unsaved linked list LLUnsaved as indicated by the arrow 902. The memory controller 404 is allowed to modify the sub mapping table L2P_G13 that has been changed to being linked by the unsaved linked list LLUnsaved. In another exemplary embodiment, the memory controller 404 refers to the sub mapping table L2P_G13 for optimization of the flash memory 402. The memory controller 404 moves the node of the sub mapping table L2P_G13 to the head of the free linked list LLFree as indicated by the arrow 906. The memory controller 404 may refer to the sub mapping table L2P_G13 whose node has been moved to the head of the free linked list LLFree. In another exemplary embodiment, the sub mapping table L2P_G13 is linked in the unchanged linked list LLUnchanged rather than the free linked list LLFree. To update the sub mapping table L2P_G13, the memory controller 404 moves the corresponding node from the unchanged linked list LLUnchanged to the head of the unsaved linked list LLUnsaved as indicated by the arrow 904. The memory controller 404 is allowed to modify the sub mapping table L2P_G13 that has been changed to being linked by the unsaved linked list LLUnsaved.

In addition, in order to reduce the computational load of the memory controller 404, no linking changes are made when the sub mapping table L2P_G13 that has been stored in the sub mapping table area 420 is referred to again. For example, the sub mapping table L2P_G13 may be referred to again in response to read commands from the host 408 or in response to optimization operations. When the sub mapping table L2P_G13 has been linked by the unsaved linked list LLUnsaved or the unchanged linked list LLUnchanged, the position of the node corresponding to the sub mapping table L2P_G13 is not changed and thereby the computational load of the memory controller 404 is reduced. In another exemplary embodiment, the sub mapping table L2P_G13 that has been linked in the unsaved linked list LLUnsaved needs to be updated one more time in response to a write command from the host 408 or in response to optimization operations. The position of the node corresponding to the sub mapping table L2P_G13 is not changed in the unsaved linked list LLUnsaved and thereby the computational load of the memory controller 404 is reduced.

Figure 10:
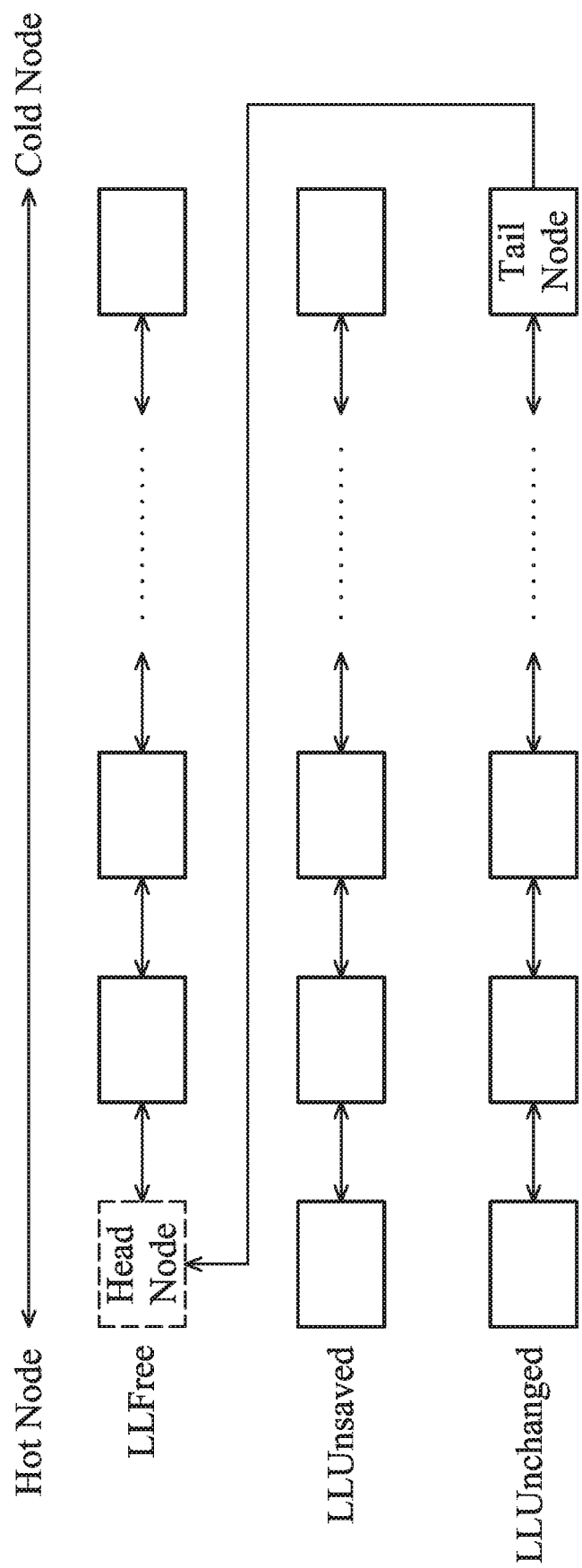
FIG. 10 illustrates how the memory controller 404 changes a tail node of the unchanged linked list LLUnchanged to a head node of the free linked list LLFree.
Figure 11:
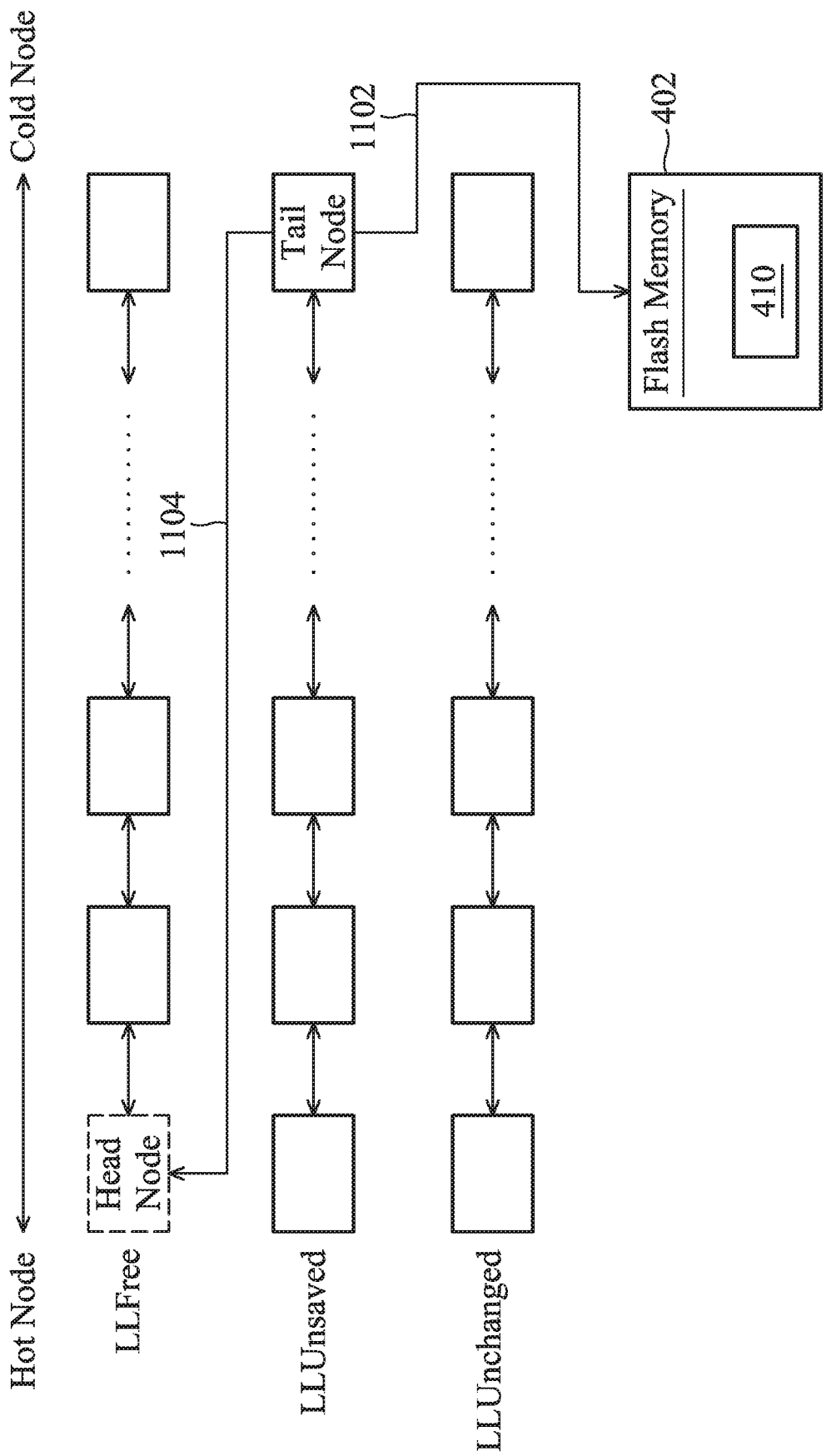
FIG. 11 illustrates another way to increase the number of free nodes. For example, the sub mapping table is linked in the unsaved linked list LLUnsaved by a tail node.

More than a threshold number of free nodes should be linked in the free linked list LLFree. FIG. 10 illustrates how the memory controller 404 changes the tail node of the unchanged linked list LLUnchanged to a head node of the free linked list LLFree. Accordingly, the number of free nodes linked in the free linked list LLFree is increased to be greater than the threshold number. FIG. 11 illustrates another way to increase the number of free nodes. For example, the sub mapping table is linked in the unsaved linked list LLUnsaved by a tail node. According to the tail node, the memory controller 404 obtains the address of a sub mapping table L2P_G13 and seals the sub mapping table L2P_G13 (that has been changed) to the flash memory 402 to update the L2P (logical-to-physical address) mapping table (410) as indicated by arrow 1102. Then, the memory controller 404 changes the node released from the tail of the unsaved linked list LLUnsaved to a head node of the free linked list LLFree (as indicated by arrow 1104). Accordingly, the number of free nodes linked in the free linked list LLFree is increased to be greater than the threshold number.

According to the free linked list LLFree, the unsaved linked list LLUnsaved, or the unchanged linked list LLUnchanged of the present invention, the sub mapping table area 420 for managing sub mapping tables L2P_G on the temporary memory 406 is optimized. A partial DRAM design results in good performance.

The memory controller 404 controlling the flash memory 402 may be implemented in other architectures. Any techniques using multiple linked lists to manage sub mapping tables L2P_G are in the scope of the present invention. In some exemplary embodiments, control methods for non-volatile memory may be realized based on the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
 a non-volatile memory, storing a logical-to-physical address mapping table that maps logical addresses recognized by a host to a physical space in the non-volatile memory, wherein the logical-to-physical address mapping table is divided into a plurality of sub mapping tables; and a memory controller and temporary storage, wherein:

the memory controller utilizes the temporary storage when controlling the non-volatile memory;

the memory controller plans a sub mapping table area in the temporary storage to store sub mapping tables corresponding to a plurality of nodes which are linked and managed by multiple linked lists;

the memory controller initially uses a free linked list to link all nodes provided on the sub mapping table area;

the memory controller further manages an unchanged linked list, and moves a node from the free linked list to the unchanged linked list to indicate a sub mapping table that is referred to in response to a read request from the host;

the memory controller further manages an unsaved linked list, and moves a node from the free linked list or the unchanged linked list to the unsaved linked list to indicate a sub mapping table that has an update; and the memory controller maps a node in the free linked list to a sub mapping table that is searched for internal optimization of the non-volatile memory, and manages the nodes in the free linked list in the order of recent use of sub mapping tables managed by the nodes in the free linked list.

2. The data storage device as claimed in claim 1, wherein:

the memory controller uses the unsaved linked list to manage sub mapping tables which have changes but have not been updated to the non-volatile memory.

3. The data storage device as claimed in claim 2, wherein:

in response to an update on a first sub mapping table that has no node corresponding thereto, the memory controller changes a tail node of the free linked list to a head node of the unsaved linked list and downloads the first sub mapping table from the non-volatile memory to the sub mapping table area to be indicated by information within the head node of the unsaved linked list.

4. The data storage device as claimed in claim 3, wherein:

in response to a read command from the host to call a second sub mapping table that has no node corresponding thereto, the memory controller changes a tail node of the free linked list to a head node of the unchanged linked list and downloads the second sub mapping table from the non-volatile memory to the sub mapping table area to be indicated by information within the head node of the unchanged linked list.

5. The data storage device as claimed in claim 4, wherein:

in response to an update on a third sub mapping table managed by the unchanged linked list, the memory controller changes a node corresponding to the third sub mapping table to a head node of the unsaved linked list.

6. The data storage device as claimed in claim 5, wherein:

in response to an update on a fourth sub mapping table managed by the free linked list, the memory controller changes a node corresponding to the fourth sub mapping table to a head node of the unsaved linked list.

7. The data storage device as claimed in claim 6, wherein:

in response to a internal optimization of the non-volatile memory that searches a fifth sub mapping table managed by the free linked list, the memory controller changes a node corresponding to the fifth sub mapping table to a head node of the free linked list.

8. The data storage device as claimed in claim 7, wherein:

when a total number of nodes managed by the free linked list is lower than a first threshold but a total number of nodes managed by the unchanged linked list is not lower than a second threshold, the memory controller changes a tail node of the unchanged linked list to a head node of the free linked list.

9. The data storage device as claimed in claim 8, wherein:

when the total number of nodes managed by the free linked list is lower than the first threshold and the total number of nodes managed by the unchanged linked list is lower than the second threshold, the memory controller seals a sub mapping table indicated by information within a tail node of the unsaved linked list to the non-volatile memory and changes the tail node of the unsaved linked list to a head node of the free linked list.

10. A non-volatile memory control method, comprising:

storing a logical-to-physical address mapping table in the non-volatile memory, wherein the logical-to-physical address mapping table maps logical addresses recognized by a host to a physical space in the non-volatile memory, and the logical-to-physical address mapping table is divided into a plurality of sub mapping tables;

utilizing temporary storage when controlling the non-volatile memory;

planning a sub mapping table area in the temporary storage to store sub mapping tables corresponding to a plurality of nodes which are linked and managed by multiple linked lists;

initially using a free linked list to link all nodes provided on the sub mapping table area;

managing an unchanged linked list and an unsaved linked list;

moving a node from the free linked list to the unchanged linked list to indicate a sub mapping table that is referred to in response to a read request from the host;

moving a node from the free linked list or the unchanged linked list to the unsaved linked list to indicate a sub mapping table that has an update; and mapping a node in the free linked list to a sub mapping table that is searched by internal optimization of the non-volatile memory, and managing the nodes in the free linked list in the order of recent use of sub mapping tables managed by the nodes in the free linked list.

11. The non-volatile memory control method as claimed in claim 10, further comprising:

using the unsaved linked list to manage sub mapping tables which have changes but have not been updated to the non-volatile memory.

12. The non-volatile memory control method as claimed in claim 11, further comprising:

in response to an update on a first sub mapping table that has no node corresponding thereto, changing a tail node of the free linked list to a head node of the unsaved linked list and downloading the first sub mapping table from the non-volatile memory to the sub mapping table area to be indicated by information within the head node of the unsaved linked list.

13. The non-volatile memory control method as claimed in claim 12, further comprising:

in response to a read command from the host to call a second sub mapping table that has no node corresponding thereto, changing a tail node of the free linked list to a head node of the unchanged linked list and downloading the second sub mapping table from the non-volatile memory to the sub mapping table area to be indicated by information within the head node of the unchanged linked list.

14. The non-volatile memory control method as claimed in claim 13, further comprising:
in response to an update on a third sub mapping table managed by the unchanged linked list, changing a node corresponding to the third sub mapping table to a head node of the unsaved linked list.

15. The non-volatile memory control method as claimed in claim 14, further comprising:
in response to an update on a fourth sub mapping table managed by the free linked list, changing a node corresponding to the fourth sub mapping table to a head node of the unsaved linked list.

16. The non-volatile memory control method as claimed in claim 15, further comprising:
in response to internal optimization of the non-volatile memory request to refer to that searches a fifth sub mapping table managed by the free linked list, moving a node corresponding to the fifth sub mapping table to be a head node of the free linked list.

17. The non-volatile memory control method as claimed in claim 16, further comprising:
when a total number of nodes managed by the free linked list is lower than a first threshold but a total number of nodes managed by the unchanged linked list is not lower than a second threshold, changing a tail node of the unchanged linked list to a head node of the free linked list.

18. The non-volatile memory control method as claimed in claim 17, further comprising:
when the total number of nodes managed by the free linked list is lower than the first threshold and the total number of nodes managed by the unchanged linked list is lower than the second threshold, sealing a sub mapping table indicated by information within a tail node of the unsaved linked list to the non-volatile memory and changing the tail node of the unsaved linked list to a head node of the free linked list.

* * * * *